United States Patent [19]

Zimmerman

[11] 3,771,056
[45] Nov. 6, 1973

[54] DISPLAY BASELINE STABILIZATION CIRCUIT

[75] Inventor: Henry A. Zimmerman, Beaverton, Oreg.

[73] Assignee: Tektronix, Inc., Beaverton, Oreg.

[22] Filed: July 30, 1971

[21] Appl. No.: 167,711

[52] U.S. Cl............... 324/57 R, 324/58 B, 324/130
[51] Int. Cl........................... G01r 27/00, G01r 1/02
[58] Field of Search................ 324/57 R, 58 B, 130; 328/186, 151; 315/25, 22

[56] References Cited
UNITED STATES PATENTS

| | | | |
|---|---|---|---|
| 3,248,655 | 4/1966 | Kobbe et al. | 328/186 |
| 3,529,249 | 9/1970 | Jasper et al. | 324/130 |
| 2,994,825 | 8/1961 | Anderson | 324/130 |
| 3,532,980 | 10/1970 | Tucker | 324/130 |

OTHER PUBLICATIONS

Halverson, H; Testing Microwave . . . ; Electronics; June 30, 1961; pgs. 86–88.

Primary Examiner—Rudolph V. Rolinec
Assistant Examiner—Ernest F. Karlsen
Attorney—Buckhorn, Blore, Klarquist & Sparkman

[57] ABSTRACT

A display baseline stabilization circuit is described which automatically compensates for differences in the quiescent D.C. voltage levels of input signals being displayed on a cathode ray tube or other display device, to maintain the baseline displays of such levels in the same vertical position. The stabilization circuit includes a sampling system for sampling the quiescent voltage level of such input signals and comparator means for comparing the sample output voltage with a D.C. reference voltage corresponding to the desired vertical position of the baseline to produce a difference voltage. The difference voltage is stored in a gated correction memory whose output is a baseline correction voltage feedback applied to the output of the sampling gate for subtraction of the correction voltage from the sample output signal transmitted to the display device. The stabilization circuit may be employed in a time domain reflectometer apparatus in which a test pulse generator, such as a tunnel diode, applies step voltage input pulses to one end of a transmission line under test to measure the value and location of any discontinuation in the characteristic impedance of such line. The other end of such transmission line is selectively terminated in an open circuit, a short circuit, or a finite resistance so that the quiescent D.C. voltage level of the step voltage input signal varies with such termination changes and tends to cause the display baseline on the cathode ray tube to move vertically. However, this movement of the baseline is prevented by the stabilization circuit.

12 Claims, 3 Drawing Figures

HENRY A. ZIMMERMAN
INVENTOR

BY
BUCKHORN, BLORE, KLARQUIST & SPARKMAN
ATTORNEYS

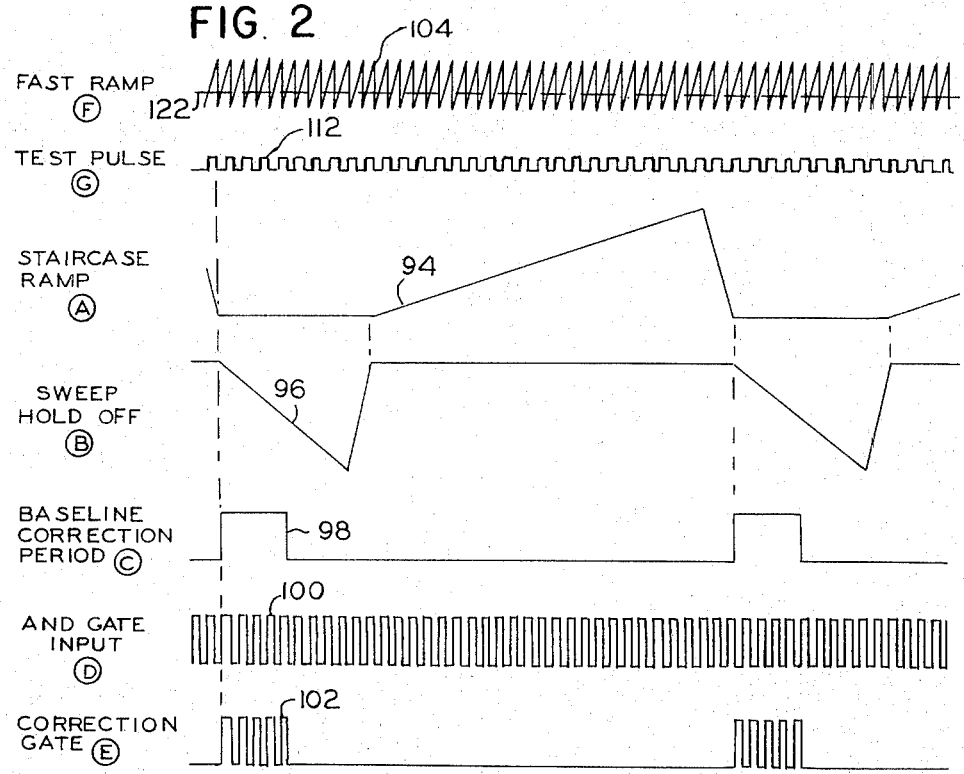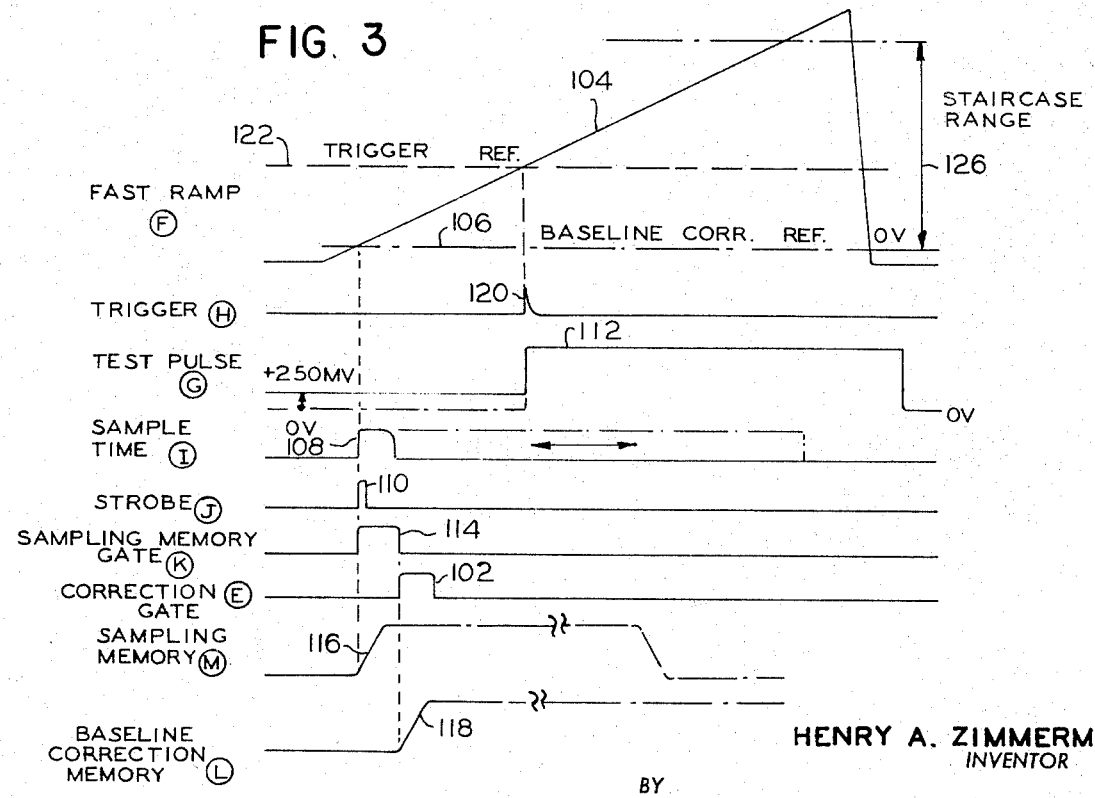

DISPLAY BASELINE STABILIZATION CIRCUIT

BACKGROUND OF THE INVENTION

The subject matter of the present invention relates generally to signal display baseline stabilization, and in particular to a stabilization circuit which automatically compensates for differences in the quiescent D.C. voltage levels of the input signals being displayed in order to maintain the display baselines corresponding to such voltage levels in the same vertical position on the display device. The stabilization circuit includes a signal sampling system, comparator means for comparing the baseline sample output of the sampling system with a reference voltage, and memory means for producing a corresponding baseline correction voltage which is applied to the sampling gate and is automatically varied to maintain the baseline sample voltage at the same value.

The display stabilization circuit of the present invention is especially useful when employed in a time domain reflectometry apparatus in which a test pulse generator using a tunnel diode as a source of step pulse input signals, is connected to one end of the transmission line under test and to the sampling gate while the other end of such transmission line is selectively connected by a switch to an open circuit termination, a short circuit termination, and a termination of finite resistance. As a result of the bias voltage of the tunnel diode, the input signal applied to the transmission line has a quiescent D.C. voltage level which changes with the different terminations. However, the stabilization circuit prevents any vertical shifting of the baseline of the displays on the cathode ray tube corresponding to such input signals as would otherwise happen without such stabilization.

Previous display stabilization circuits subtracted a compensating D.C. offset voltage from the quiescent voltage level of the input signal to reduce such voltage level to zero. However, this increased the rise time of the step voltage input signal and caused other deformations in its waveform because of the low pass filter formed by the series inductance and the shunt capacitance, respectively, of the added D.C. voltage source or D.C. current source producing such offset voltage. A further disadvantage of such prior display stabilization circuits is that their proper operation is dependent upon the stability of the tunnel diode characteristics. The display stabilization circuit of the present invention overcomes these disadvantages by employing a signal sampling system to display the step voltage input signal and subtracting the baseline correction voltage to the sample voltage rather than from the input signal applied to the transmission line.

It may be desirable to manually adjust the D.C. offset voltage of the sampling gate in order to change the vertical position of the display. This may be done by connecting the movable contact of the manual offset potentiometer to the input of a summing amplifier whose other input is connected to the output of the baseline correction memory and applying the output of such summing amplifier to the output of the sampling gate. A disabling switch is provided between the manual offset potentiometer and the summing amplifier in order to disconnect such manual offset potentiometer during the time the baseline correction is being made.

A signal sampling system similar to that disclosed in U. S. Pat. No. 3,248,655 of Kobbe et al. may be employed in the display stabilization circuit of the present invention. A correction gate, a differential amplifier comparator, a baseline correction memory, and a summing amplifier are connected in a negative feedback loop from the output of the sampling system to the sampling gate at the input of such sampling system. The baseline correction voltage is applied to the output of the sampling gate and is subtracted from the input signal voltage applied to the input of the sampling gate to produce the sample voltage output when the gate is rendered conducting by strobe pulses. As a result, the baseline sample output voltage produced at the output of the sampling system and corresponding to the quiescent D.C. voltage level of the test pulse input signal is maintained at the same voltage even though the quiescent voltage level of such input signal changes. Thus, the vertical position of the signal display baseline on the cathode ray tube also remains the same to stabilize the display baseline even though the quiescent D.C. voltage level of the step pulse input signal changes when different terminations are connected to the output of the transmission line being tested in the time domain reflectometer.

It is, therefore, one object of the present invention to provide an improved display stabilization circuit which automatically compensates for different quiescent D.C. voltage levels of the input signals being displayed in order to maintain the signal display baselines corresponding to such levels at the same display position.

Another object of th invention is to provide such a stabilization circuit employing a sampling system whose output is connected to the display device and whose sampling gate has a baseline correction voltage applied thereto in order to cancel the quiescent D.C. voltage level of the input signal so that the sample output signals applied to the display device corresponding to the input signals all have the same baseline voltage.

Still another object of the invention is to provide such a display stabilization circuit in which the baseline correction voltage is provided by a negative feedback path connected from the output of the sampling system to its sampling gate.

A still further object of the invention is to provide such a display stabilization circuit whose proper operation is independent of the stability of the characteristics of the tunnel diode or other semiconductor switching device employed as the pulse generator source of input signals.

An additional object of the present invention is to provide the display stabilization circuit in a time domain reflectometer apparatus for testing transmission lines for discontinuities in their characteristic impedance.

A still additional object of the invention is to provide such a time domain reflectometry apparatus in which the output of the transmission line is switched between an open circuit termination, a closed circuit termination and a termination of finite resistance to provide the step pulse input signals with different quiescent D.C. voltage levels while the corresponding baselines of signal displays produced on the cathode ray tube connected to the output of the sampling system are maintained in the same vertical display position.

BRIEF DESCRIPTION OF DRAWINGS

Other objects and advantages will be apparent from the following detailed description of a preferred embodiment thereof and from the attached drawings of which:

FIG. 2 is a waveform diagram of signals produced in the circuit of FIG. 1; and

FIG. 3 is another waveform diagram of signals produced in the circuit of FIG. 1 on a more expanded time scale than the waveforms of FIG. 2.

DESCRIPTION OF PREFERRED EMBODIMENT

Figure 1:
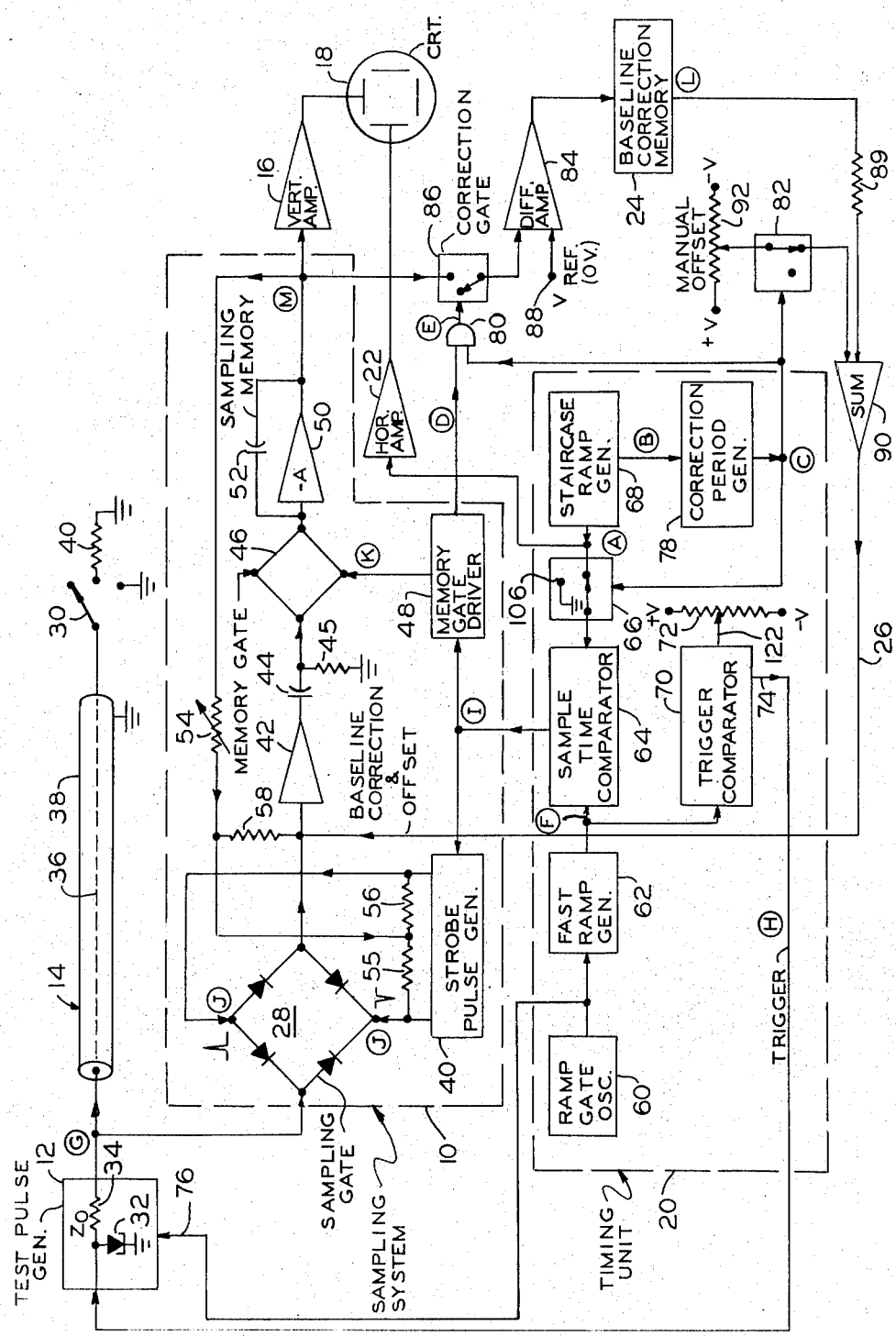
FIG. 1 is a schematic block diagram of a display stabilization circuit in accordance with the present invention employed in a time domain reflectometry apparatus.

As shown in FIG. 1, a time domain reflectometer apparatus using one embodiment of the display stabilization circuit of the present invention includes a signal sampling system 10 which may be similar to that shown in U. S. Pat. No. 3,248,655 of Kobbe et al. The sampling system is connected at its input in common with the output of a test pulse generator 12 and the input of a transmission line 14 of substantially uniform characteristic impedance in order to determine the size and location of any discontinuities in the characteristic impedance of such transmission line. The output of the signal sampling system 10 is connected through a vertical amplifier 16 to the vertical deflection plates of a cathode ray tube 18 or other display device of the reflectometer apparatus. A timing unit 20 is provided to supply trigger pulses H to the test pulse generator 12, as well as to apply a slow ramp or staircase sweep signal A through the horizontal amplifier 22 to the horizontal deflection plates of the cathode ray tube. A baseline correction means including a correction memory circuit 24 is connected to provide negative feedback from the output of the sampling system through a feedback conductor 26 to the output of a sampling gate 28 at the input of such sampling system. The baseline correction voltage is subtracted from the input signal voltage applied to the input of the sampling gate during sampling when such gate is rendered conducting by strobe pulses in the manner hereafter described. As a result, each output signal voltage produced at the output of the sampling system and displayed on the cathode ray tube 18 has the same baseline voltage level even though the quiescent D. C. voltage of its corresponding input signal applied to the input of the sampling gate 28 changes as a result of selectively connecting different terminations to the output of the transmission line 14 by switch 30.

The test pulse generator 12 includes a tunnel diode 32 or other semiconductor switching device which produces a step voltage input pulse of extremely fast rise time which is transmitted through the output resistance 34 of the pulse generator to the input of the transmission line 14. The input pulse at the anode of the tunnel diode has a quiescent D.C. voltage level of about +250 millivolts because the tunnel diode is biased near a peak voltage of this value to enable fast triggering by the timing unit. The transmission line 14 may be a coaxial cable having an inner signal conductor 36 and a grounded outer conductor or shield 38. The inner signal conductor 36 is connected at one end to the output of the test pulse generator 12 and at its other end to the termination switch 30. The termination switch 30 selectively connects the output end of the transmission line signal conductor 36 to an open circuit termination in the position shown, to a finite termination resistance 40 whose other terminal is grounded, and to a short circuit termination provided by the grounded contact. Termination resistance 40 may be equal to the characteristic impedance of the transmission line or some other finite resistance. In the open circuit position of the termination switch 30, the step pulse input signal G applied to the transmission line has a quiescent D.C. voltage of +250 millivolts because there is no D.C. current flow through the output resistance 34. In the short circuit termination position of switch 30, the quiescent D.C. voltage level of the step pulse input signal applied to the transmission line is zero because its inner signal conductor 36 is grounded. In the middle position of the termination switch 30 connecting the termination resistance 40 to signal conductor 36, the quiescent D.C. voltage level of the step pulse input signal is at some voltage between zero and +250 millivolts due to the voltage divider formed by output resistance 34 and the termination resistance 40. For example, such quiescent D.C. voltage level will be about +125 millivolts when the termination resistance 40 is equal to the characteristic impedance, $z_o$, of the line since this is also the value of the pulse generator output resistance 34. Thus, it can be seen that without the display stabilization circuit of the present invention, the baseline of the signal display produced on the cathode ray tube 18 would change its vertical position on such tube depending upon the position of the termination switch 30 due to the different quiescent D.C. voltage levels of the input signal. This results in movement of the signal display and its baseline which causes inaccuracies in measuring the voltage amplitude of such displays. This makes it difficult to determine the magnitude of the discontinuities in the characteristic impedance of the transmission line 14 being measured by the time domain reflectometer apparatus.

The sampling system 10, disclosed in U. S. Pat. No. 3,248,655, includes a strobe pulse generator 40 which applies strobe pulses of opposite polarity to the two side terminals of the sampling gate 28 in order to render the diodes of such gate momentarily conducting and transmit a sample voltage portion of the input signal through such gate. The output of the sampling gate is connected through an amplifier 42 and an A.C. coupling including a coupling capacitor 44 and shunt resistor 45 to the input of a memory gate 46. The memory gate is normally bias nonconducting and is rendered conducting for a brief time by the output pulse of a memory gate driver circuit 38 in order to transmit the sample voltage into a sampling memory circuit 50 connected to the output of such memory gate. The sampling memory circuit 50 is a Miller integrator type of ratchet memory formed by a voltage inverter amplifier and a negative feedback capacitor 52 connected from the output to the input of such amplifier so that the sample voltage is stored in such memory capacitor. After the memory capacitor 52 is charged to the sample voltage, the memory gate 46 returns to its quiescent nonconducting condition to prevent discharge of such capacitor. As a result, a ratchet or stair step type of sample output voltage is produced at the output of the sampling memory and applied to the vertical amplifier 16. A feedback resistor 54 is connected from the output of the sampling memory to the common junction of a pair of bias resistors 55 and 56 and to the output of the sampling gate 28 through another feedback resistor 58. The bias resistors 55 and 56 are connected across the sides of the sampling gate to reverse bias the diodes of such gate nonconducting. As a result, a feedback portion of the output sample voltage stored on the memory capacitor 52 is transmitted through feedback resistance 54 and 58 to the output of the sampling gate and is subtracted from the voltage of the next successive input signal so that only the difference between these voltages is transmitted through the sampling gate as the sample voltage to the sampling memory. In order to prevent this feedback voltage applied to the output of the sampling gate from forward biasing the sampling gate diodes conducting, such feedback voltage is also supplied to the common terminal of the bias diodes 55 and 56.

The timing unit 20 includes a ramp gate oscillator 60 which free runs at a predetermined frequency and triggers a fast ramp generator circuit 62 to produce a fast ramp voltage signal. This fast ramp voltage is applied to the input of a sample time comparator 64 whose other input is connected through a switch 66 to a slow ramp or staircase generator 68 which applies a staircase ramp A thereto and to the horizontal amplifier 22 connected to the horizontal deflection plates of the cathode ray tube 18.

The sample time comparator 64 produces an output pulse I when the fast ramp voltage equals the voltage of the staircase ramp step applied thereto. This output pulse is applied to the strobe pulse generator and causes it to produce a narrow fast risetime strobe pulse which is supplied to the sampling gate to render it conducting. The output pulse of the sample time comparator 64 is also applied to the memory gate driver 48 which causes the memory gate 46 to be rendered conducting at the time the strobe pulse is produced and maintains such memory gate conducting until after the sample voltage transmitted through the sampling gate has charged the sampling memory capacitor 52 to its full value. The output of the fast ramp generator 62 is also connected to one input of a trigger generator comparator circuit 70 whose other input is connected to a D.C. voltage at the movable contact of a potentiometer 72 whose end terminals are connected to positive and negative D.C. voltage sources. When the fast ramp voltage equals this D.C. voltage the comparator 70 switches and produces an output trigger pulse H which is transmitted through conductor 74 to the test pulse generator 12 in order to trigger tunnel diode 32 from its quiescent low voltage state to a high voltage state. The tunnel diode 32 is connected as a bistable device and is reverted from its high voltage stable state to its quiescent low voltage stable state by reducing its bias current within the test pulse generator 12 at a time controlled by an input 76 from the oscillator 60.

From the above, it can be seen that the test pulse generator 12 is triggered to produce a step pulse input signal each time a fast ramp voltage is produced. A strobe pulse is also produced by strobe pulse generator 40 for each fast ramp at a time relative to the start of the fast ramp voltage which changes depending upon the voltage of the staircase ramp which advances one stair step for each successive strobe pulse. This enables the sampling gate to sample different portions of each successive step pulse input signal waveform so that a low frequency reproduction of such waveform is produced at the output of the sampling memory 50 in the manner of a conventional sampling oscilloscope.

During the baseline correction operation hereafter described, the staircase ramp generator 68 is disconnected from the sampling time comparator 64 by moving switch 66 to the grounded position in order to produce strobe pulses when the fast ramp voltage crosses the zero volt level, to sample the quiescent D.C. voltage level of the step pulse input signal. The switch 66 is controlled by a correction period generator 78 in the timing unit 20 whose input is connected to a retrace output of the staircase ramp generator 68 so that the correction period generator is triggered at the end of the retrace portion of the staircase ramp signal to produce a correction period gate pulse C. This gate pulse is also applied to one input of an And gate 80 and to the control input of an offset switch 82 in the baseline correction circuit.

The baseline correction memory circuit has its input connected to the output of a comparator means which may be a difference amplifier 84 having one input connected through a gate switch 86 to the output of the sampling memory 50 and 52 and having its other input connected to a source 88 of D.C. reference voltage. The reference voltage 88 may be zero volts and corresponds to the desired vertical position of the signal display baseline on the cathode ray tube 18. The output of the correction memory 24 is connected through a coupling resistor 89 to one input of a summing amplifier 90. The other input of the summing amplifier 90 is connected through the offset switch 82 to the movable contact of a potentiometer 92 forming a manual offset control whose end terminals are connected to positive and negative D.C. voltages, respectively. The output of the summing amplifier is connected through feedback conductor 26 to the output of the sampling gate 28 in order to add the baseline correction voltage stored in memory 24 to the sampling output voltage supplied through feedback resistors 54 and 58 for subtraction from the next input signal applied to the sampling gate. In the shown normal position of offset switch 82, an offset voltage is added to the baseline correction voltage when the offset control 92 is moved off of its zero volt position to enable the operator of the time domain reflectometry apparatus to manually control the vertical position of the input signal waveform display on the cathode ray tube 18. However, this manual offset control 92 is disconnected by switch 82 from the summing amplifier when the baseline correction voltage is being undated in the correction memory 24 by the comparator amplifier 84 because the correction period generator 78 produces an output pulse at this time.

The And gate 80 has one input connected to the memory gate driver 48 and its other input connected to the correction period generator 78 so that such And gate is rendered conducting only when the memory gate 46 rendered conducting. Actually, the And gate 82 is rendered conducting at a time slightly after the memory gate is rendered conducting in order to enable the memory capacitor 52 to charge to its full sample voltage before the output of the sampling memory is connected through gate switch 86 to the difference amplifier 84.

The operation of the display baseline stabilization circuit will now be described with reference to the signal waveforms of FIGS. 2 and 3 whose locations are indicated on the circuit diagram of FIG. 1 by the circled letters corresponding thereto. As shown in FIG. 2, the staircase ramp voltage 94 which may be of the slow ramp linear waveform shown or a stair step signal has a sweep holdoff period between the termination of the negative going retrace portion of the previous staircase ramp and the start of the next successive staircase ramp. During this holdoff period, a sweep holdoff signal 96 is produced within the staircase ramp generator 68 and is applied to the correction period generator 78. The correction period generator produces a correction period pulse 98 during the beginning portion of the sweep holdoff signal 96 and applies such correction period pulse to And gate 80, to comparator switch 66 and to offset switch 82. This moves switches 66 and 82 into the other position from that shown. The memory gate driver 48 applies a plurality of pulses 100, one for each sample taken by the sampling gate, to the other input of the And gate 80 which causes a correction gate output signal 102 to be produced at the output of such And gate. The correction gate signal includes a plurality of pulses 102 having the same duration as pulses 100, but are only produced during the correction period 98. The gate pulses 102 are applied to the correction gate to render it conducting. Thus, the correction gate switch 86 is closed during each correction gate pulse 102 to transmit baseline sample output voltages from the output of the sampling memory 50 and 52 to one input of the difference amplifier 84. The difference amplifier acts as a comparator to compare the baseline sample output voltages with the D.C. reference voltage 88 applied to its other input and produces a difference signal output which is applied to the correction memory 24 and stored therein.

As shown in FIG. 3, the fast ramp voltage 104 produced by ramp generator 62 is compared with a baseline correction reference voltage 106 which is a D.C. voltage, for example of zero volts, provided at the grounded switch contact 106 of the comparator switch 62 when the movable contact of such switch is switched to this position by the baseline correction period signal 98. When the fast ramp voltage 104 equals the baseline correction reference voltage 106, the sample time comparator produces a timing pulse 108 which triggers the strobe pulse generator 40 and causes it to produce strobe pulses 110. The strobe pulses are applied to the sampling gate 28 to render it conducting and cause it to sample the quiescent D.C. voltage level of a test pulse input signal 112 applied to both the input of the sampling gate and the input of the transmission line 14. In the shown open circuit termination position of switch 30, the quiescent D.C. voltage level of the test pulse input signal 112 is about +250 millivolts due to the bias current of tunnel diode 32. However, in the short circuit or grounded position of switch 30, the quiescent D.C. voltage level of the test pulse input signal 112 is zero volts, while in the middle position of switch 30 connected termination resistance 40 of such quiescent D.C. voltage is at some intermediate value between 250 millivolts and zero volts. Thus, the value of this quiescent D.C. voltage level of the test pulse input signal 112 varies and is sampled by the sampling gate to determine the proper amount of baseline correction voltage. The quiescent voltage sample is transmitted through the sampling system to the sampling memory capacitor 52 when the memory gate 46 is opened by a sampling memory gate pulse 114 produced by the memory gate driver 48 triggered by the sample time signal 108. This causes a sampling memory output voltage 116 to be stored on the memory capacitor 52 whose voltage corresponds to the difference between the quiescent D.C. voltage level of the test pulse input signal 112 and the total D.C. feedback voltage applied to the output of the sampling gate by the feedback resistors 54 and 58 and by the baseline correction memory 24. After the sampling memory capacitor 52 is charged to the full value of the baseline sample output signal 116, the correction gate 86 is rendered conducting by the gate signal output 102 of the And gate 80 to transmit such baseline sample output to the difference amplifier 84. A difference voltage is produced at the output of the amplifier 84 equal to the difference between the D.C. reference voltage 88 and the baseline sample output voltage which is applied to the baseline correction memory 24 to produce a correction memory output signal 118.

Several successive samples are taken of the quiescent D.C. voltage level of the input signal corresponding to the signal display baseline, one for each of the correction gate pulses 102 until the baseline correction voltage 118 is substantially equal to the quiescent D.C. level of the test pulse input signal 112. Since this baseline correction voltage is applied to the output of the sampling gate, it is subtracted from the test pulse input signal 112 applied to the input of the sampling gate which effectively removes any quiescent D.C. voltage level from the sampling output signal corresponding to such input signal. It should be noted that this baseline correction voltage varies and automatically compensates for any changes in the quiescent D.C. voltage level of the test pulse input signal due to changes in the termination at the output end of the transmission line 14.

A trigger pulse 120 is produced at the output 74 of the trigger comparator 70 when the fast ramp voltage 104 reaches the trigger reference voltage 122 on the movable contact of the potentiometer 72. This trigger pulse is applied to the test pulse generator 12 and triggers the tunnel diode 32 to produce a fast risetime positive voltage step forming the test input pulse signal 112. It should be noted that in normal operation of the sampling system when the output of the staircase generator 68 is connected by switch 66 to the sampling time comparator, the fast ramp voltage 104 is compared with a staircase voltage which increases one step for each sample and varies over a wide range 126. This causes the strobe pulse 110 to occur at successively later times with respect to the start of the fast ramp voltage in order to sample different waveform portions of successive test pulse input signals 112. Of course, this staircase range must be sufficient to enable sampling of signal reflections from any discontinuities in the characteristic impedance of the transmission line 14.

It will be obvious to those having ordinary skill in the art that many changes may be made in the details of the above-described preferred embodiment of the present invention without departing from the spirit of the invention. For example, the display stabilization circuit of the present invention may be employed for the display of other signals than those employed in a time domain reflectometry apparatus. Therefore, the scope of the present invention should only be determined by the following claims.

I claim:

1. Display baseline stabilization circuit automatically compensating for differences in the quiescent D.C. voltage levels of a plurality of input signals being displayed on a signal waveform display device, to maintain the signal display baselines corresponding to said levels in the same vertical display position, in which the improvement comprises:

a sampling system for sampling different portions of the waveform of said input signals applied to a sampling gate at the input of said system to produce corresponding sample output signals in a sampling memory at the output of said system which are applied to the display device;

timing means for causing said sampling system to sample the quiescent D.C. voltage level of said input signals and provide a corresponding baseline sample voltage at the output of said sampling system;

comparator means for comparing said baseline sample voltage with a D.C. reference voltage corresponding to said vertical display position to produce a difference voltage output;

baseline correction means connected to the difference voltage output of said comparator means for producing a correction voltage corresponding to the quiescent D.C. voltage level of the input signal; and feedback means including said correction means and said comparator means, connected from the output of said sampling memory to said sampling gate for applying said correction voltage to the sampling gate to remove at least a portion of said quiescent voltage level from said sample output signals so that their display baselines are maintained the same even though there are differences in the quiescent D.C. voltage levels of the corresponding input signals.

2. A circuit in accordance with claim 1 in which the baseline correction means includes a memory means for storing said difference voltage to produce said correction voltage at its output and gate means for selectively applying said difference signal to the input of said memory means only during the baseline portion of the signal.

3. A circuit in accordance with claim 2 in which the baseline correction means also includes a manual offset control means for adding a manually variable D.C. offset voltage to the correction voltage, and switch means for selectively disconnecting said offset control means from the summing amplifier means when said memory means is connected by said gate means.

4. A circuit in accordance with claim 2 in which the comparator means and said baseline correction means provide a negative feedback loop for the sampling system when the memory means is connected by said gate means to the output of said sampling system.

5. A circuit in accordance with claim 2 in which the comparator means is a difference amplifier having two inputs connected respectively to the output of said sampling system and to the source of said reference voltage, and having its output connected to the input of said memory means.

6. A circuit in accordance with claim 1 in which the display device is a cathode ray tube having its vertical deflection means connected to the output of the sampling system.

7. A circuit in accordance with claim 6 in which the cathode ray tube has its horizontal deflection means connected to the output of a slow ramp voltage sweep generator means which controls said timing means so that said baseline sample voltage is taken during the time between the end of the retrace portion of the previous slow ramp voltage and the start of the next successive slow ramp voltage.

8. A circuit in accordance with claim 1 in which the input of the sampling system is connected in common to a test pulse generator source of step shaped input pulses and one end of a transmission line under test, forming a time-domain reflectometer apparatus so that said input signal includes the input pulse and the signal reflections from impedance discontinuities in the characteristic impedance of said line.

9. A circuit in accordance with claim 8 in which the display device is a cathode ray tube and the output of the sampling system is connected to the vertical deflection means of the cathode ray tube.

10. A circuit in accordance with claim 8 in which the other end of the transmission line is selectively connected by a switch means between different termination means including a short circuit termination, an open circuit termination and a termination of finite resistance.

11. A circuit in accordance with claim 8 in which the test pulse generator is a triggered oscillator having at least one stable state which is connected to the output of said timing means for triggering said pulse generator after said baseline sample voltage is produced.

12. A circuit in accordance with claim 11 in which the test pulse generator includes a tunnel diode which produces the step input pulses.

* * * * *